Patented July 25, 1933

1,919,369

UNITED STATES PATENT OFFICE

HORACE A. HOLADAY, OF HIGHLAND PARK, AND ARCHIE BLACK, OF NEW BRUNSWICK, NEW JERSEY, ASSIGNORS TO E. R. SQUIBB & SONS, OF NEW YORK, N. Y., A CORPORATION OF NEW YORK

METHOD OF PREPARING FAT-SOLUBLE-VITAMIN-CONCENTRATES

No Drawing. Application filed November 10, 1932. Serial No. 642,062.

This application is a continuation in part of application Serial No. 383,974, filed August 6, 1929.

This invention relates to concentrates of the fat-soluble vitamins (especially vitamins A and D), and has for its object the provision of a method whereby such concentrates may be efficiently prepared from the fats in which these vitamins naturally occur, for example cod-liver oil.

Essentially the method of this invention comprises the steps of saponifying the vitamin-containing fats with alcoholic concentrated sodium hydroxide solution and adding to the saponification mass, which then contains only a small weight-proportion of water and is hot, a vitamin-solvent-soap-precipitant selected from the group consisting of ether, dichlorethylether, and acetone. The sodium hydroxide solution is preferably hot; and the water may be added before, with, or after the sodium hydroxide solution, and preferably constitutes less than one-eighth the weight of the saponification mass.

Saponification takes place very rapidly, being complete within half an hour, and the vitamin-solvent-soap-precipitant may then be introduced at once. Subsequently the mixture is filtered or drained; and the vitamin-solvent-soap-precipitant and the alcohol are removed from the filtrate by vacuum distillation. The residue is dissolved in the vitamin-solvent-soap-precipitant, and the resulting solution is washed successively with dilute aqueous sodium hydroxide solution and water to remove glycerol, excess alkali, and any soap and fatty acids that may have been dissolved in the extract. The washed solution is evaporated to dryness, preferably anaerobically, and there results an amber-colored semi-solid residue having about 0.7% of the mass of the original fat. By crystallization from alcohol, this concentrate may be freed from cholesterol, and its proportion reduced to between 0.4% and 0.5%. Further purification, and concurrent removal of much of the disagreeable odor, may be accomplished by treatment with steam under reduced pressure.

If acetone is used as the vitamin-solvent-soap-precipitant, the procedure must be modified slightly; for considerable polymerization of the acetone ordinarily occurs in the presence of the excess alkali. The polymerization products have a disagreeable odor and flavor and are difficult to remove from the final concentrate. It was found in a detailed study of this reaction that the alkalinity of the soap mixture, the duration of contact with acetone, and the temperature of the mixture determined the degree of polymerization; and that this undesirable reaction can be largely prevented by neutralizing the excess alkali with sodium bicarbonate or acetic acid before adding the acetone to the soap, by avoiding elevated temperatures, and by distilling the acetone promptly after extraction.

Crude concentrates prepared by this method gave vitamin-A color tests corresponding to 65% to 95% of the original fat, and peanut-oil solutions of the concentrates made up to the volume of the fat from which the concentrates were prepared contained high percentages of vitamins A and D as shown by biological tests with rats.

As an example of the invention, 3200 grams of sodium hydroxide, either dry or as a 45% to 50% aqueous solution, is added to 4.5 gallons of ethyl alcohol, and the mixture is brought to boiling and refluxed until the air is expelled. Then 4.5 gallons of cod-liver oil is added slowly and the mixture boiled under reflux for thirty minutes. This warm solution is added to 47 gallons of dichlorethylether while agitating, and agitation is continued for about an hour. The mixture being allowed to stand another hour, the dichlorethylether extract settles to the bottom, and 45 gallons is drained off. This extract is washed once with 10 gallons of 0.5% sodium hydroxide solution to remove a small amount of soap dissolved in the extract; the dichlorethylether is removed in about three and one-half hours by distillation at a temperature between 75° and 80° C.; and the vacuum is released with carbon dioxide in order to prevent oxygen from coming into contact with the concentrate. The residue is dissolved in 4 liters of ether; the solution is washed twice with 2% sodium hydroxide solution and then with water in order to remove the last traces of soap and fatty acids; the washed solution is evaporated to dryness; and a current of steam is passed through the oily residue in order to remove the last traces of solvent and to improve the flavor and odor.

Concentrates prepared by the foregoing processes were shown, by color and biological tests, to contain definitely more than 65% of the original vitamin A, and by biological tests to contain 75% of the original vitamin D.

As a further example, 150 grams of sodium hydroxide, either dry or as a 45% to 50% aqueous solution, may be added to 1500 cc. of alcohol, and the mixture brought to boiling and refluxed until the air is expelled. Then 500 grams of cod-liver oil is added slowly through a dropping funnel, the mixture boiled under reflux for thirty minutes and allowed to cool; and 8 liters of ether is added, the mixture vigorously stirred and allowed to stand half an hour. The soap is filtered off on a cloth, screw-pressed until fairly dry, and completely dried in the oven, its weight then being 465 grams, or 91% of the theoretical yield of 510 grams. The ether filtrate is concentrated to about 200 cc. and a vacuum applied to remove the alcohol; 2 liters of ether is added to the residue; and the soap precipitated is removed and washed with a small amount of ether, which is then added to the first filtrate. On drying, the soap is found to weigh 30 grams, or 5.8% of the total theoretical amount. To the ether solution, 4 liters of water is added and the mixture allowed to stand until completely separated in a water and an ether layer. The former is removed and washed twice in 500 cc. portions of ether and the washings added to the main ether solution; and the latter washed thrice with 2 liters of 5% sodium hydroxide solution to remove soap and fatty acids, and then thrice with 2 to 3 liters of water to remove alkali. On evaporation of the ether solution to dryness in an atmosphere of carbon dioxide, a residue weighing 4.58 grams is obtained.

This concentrate when so diluted with olive oil as to make 1 gram equivalent to 1 gram of the original oil, gave a color test of 4670 as compared with 5100 for the original oil, indicating a 91% recovery of the color-producing substances, supposed to be vitamin A; and the mixture when tested for vitamin A by curing vitamin-A deficiency in rats showed a positive test at doses approximately the same as those of the original oil.

As a still further example, 8 kg. of cod-liver oil is added slowly to a hot solution consisting of 16 liters of ethyl alcohol and 2100 cc. of aqueous caustic soda containing 1600 grams of the solid; and the mixture is boiled for half an hour to bring about complete saponification. To neutralize the excess alkali, 1500 grams of sodium bicarbonate is added and the mixture is stirred, added to 120 liters of acetone, and mechanically agitated for 15 minutes. The soap is filtered on a cloth and finally pressed in a screen press, 93% of the oil being thus removed as soap and 110 liters of acetone recovered in the filtrate. This extract is concentrated to about 7 liters by vacuum distillation, dissolved in 20 liters of ether, and the solution washed three times with 1% sodium hydroxide solution and three times with water to remove the soap and the fatty acids, and evaporated by vacuum distillation until an amber-colored oil remains, care being taken to keep the residue under anaeric conditions. This residue is now treated with steam for an hour at 110° to 115° C. to remove the disagreeable odor and flavor. The concentrate, weighing at this stage 0.93% as much as the original oil, is reduced to 0.46% by removal of a large part of the cholesterol by crystallization from alcohol solution.

A concentrate thus prepared, dissolved in a volume of peanut oil equal to the volume of cod-liver oil represented and then tested biologically for vitamins A and D, gave the following results: In the vitamin-A test, five rats of six which were deficient in vitamin A, recovered when fed 2 mg. of the concentrate solution daily for a 35-day test period; the original oil producing recovery at the same dose, but not at a dose of 1.5 mg. daily. In the vitamin-D test all of six rats which had become rachitic when fed Steenbock's rickets-producing diet 2965, showed definite evidence of healing when fed a total dose of 70 mg. of the concentrate solution over 6 days and examined at the end of the tenth day; the original oil giving positive evidence of healing at a similar dose. By the antimony trichloride test for vitamin A, the concentrate was found to possess 95% of the activity of the original oil.

It will be understood that the foregoing examples are merely illustrative and by no means limitative of the invention, which may be variously otherwise embodied—as with respect to fats, solvent-precipitants, reactants, proportions, and procedures—within the scope of the appended claims.

We claim:

1. The method of concentrating vitamin-containing fats that comprises essentially the steps of saponifying them with alcoholic concentrated sodium hydroxide solution and adding to the saponification mass, which then is less than one-fourth water by weight and is hot, a vitamin-solvent-soap-precipitant selected from the group consisting of ether, dichlorethylether, and acetone.

2. The method of concentrating cod-liver oil that comprises essentially the steps of saponifying it with hot alcoholic concentrated sodium hydroxide solution and adding to the saponification mass, which then is less than one-fourth water by weight and is hot, a vitamin-solvent-soap-precipitant selected from the group consisting of ether, dichlorethylether, and acetone.

3. The method of concentrating cod-liver oil that comprises essentially the steps of saponifying it with alcoholic concentrated sodium hydroxide solution and adding ether to the saponification mass, which then is less than one-fourth water by weight and is hot.

4. The method of concentrating cod-liver oil that comprises essentially the steps of saponifying it with alcoholic concentrated sodium hydroxide solution and adding dichlorethylether to the saponification mass, which then is less than one-fourth water by weight and is hot.

5. The method of concentrating cod-liver oil that comprises essentially the steps of saponifying it with alcoholic concentrated sodium hydroxide solution and adding acetone to the saponification mass, which then is less than one-fourth water by weight and is hot.

HORACE A. HOLADAY.
ARCHIE BLACK.